Dec. 20, 1966 A. MAZURE ET AL 3,293,555
SYSTEM FOR CONTROLLING THE SAMPLING OF SERIALLY
RECEIVED SIGNAL ELEMENTS
Filed June 25, 1963 3 Sheets-Sheet 1

INVENTORS
ALEXANDER MAZURE
ALBERT C. RUOCCHIO
LARRY L. STICKLER
LAWRENCE A. TATE
WALTER D. VAN GIESON JR.
BY Robert W. Berray
ATTORNEY

United States Patent Office 3,293,555
Patented Dec. 20, 1966

3,293,555

SYSTEM FOR CONTROLLING THE SAMPLING OF SERIALLY RECEIVED SIGNAL ELEMENTS

Alexander Mazure, Poughkeepsie, Albert C. Ruocchio, Beacon, Larry L. Stickler, Wappingers Falls, Lawrence A. Tate, Poughkeepsie, and Walter D. Van Gieson, Jr., Wappingers Falls, N.Y., assignors to International Business Machines Corporation, New York, N.Y., a corporation of New York Filed June 25, 1963, Ser. No. 290,559
8 Claims. (Cl. 328—155)

The present invention relates to a system for controlling the sampling of serially received signal elements and, more particularly, to a system for adjusting the frequency of the sample pulse to cause it to sample the received elements at an optimum time.

A serial train of signal elements placed on any transmission medium, where each signal element represents data by exhibiting one of two states, is common to nearly every form of data transfer in today's digital computers and business machines. In telegraphic terms the signal elements may be referred to as mark or space elements, and in binary data transfer the elements may be referred to as binary 1 or binary 0. In all systems there exists a clock or timing source that controls the frequency at which signal elements are to be transmitted. This results in a predetermined width for each signal element, whether it be a mark or space element, that is theoretically the same. In a system receiving the serially transmitted elements there exists an optimum time for making the decision whether the received element is a mark or space. This optimum time is the center of each received signal element. A difference in the frequency of the clock of the transmitter and the generator of a sampling pulse at a receiver, along with distortion introduced into the total transmission system makes the optimum time for sampling a fraction of the total width of each received element.

Various techniques are used for insuring that a sample pulse at the receiving system is made to occur as close to the center of received signal elements as possible. One technique is to precede each group of character-representing signal elements with a synchronizing pulse to initiate the sampling of the remaining signal elements of the character. Two other techniques are known wherein a synchronizing pulse preceding each character is not required. One of these techniques is described in copending application Serial No. 51,956, filed August 25, 1960, now Patent No. 3,208,049, by C. R. Doty et al., entitled "Synchronous Transmitter Receiver." This is a digital technique wherein oscillators used at the transmitter and receiver of the system have a frequency much higher than the frequency at which the signal elements are transmitted. The oscillator outputs are presented to frequency dividers whose outputs control the transmission and sampling frequency. Means are provided for measuring the position of the receiving sample pulse with respect to the center of each received signal element to derive a control which changes the natural frequency of the frequency divider to adjust the receiver sample pulse to the center of received signal elements. Another method of measuring the position of a receiver sampling pulse with respect to the center of received signal elements is analog in nature. Integrators are used to generate voltage potentials representative of the position of the sample pulse with respect to the leading and trailing edges of received signal elements. The voltage potentials generated are compared with reference potentials to generate error signals adjusting the frequency of the receiving sample pulse to place the sample pulse at the center of received signal elements. The methods mentioned above are quite suitable for data transmission frequencies commonly in use today. However, all have disadvantages in data transmission ssytems being developed which will increase transmission frequencies to the range of over 2 megacycles as compared with present systems in the low kilocycle range. Needless to say, the use of a sync element wastes valuable transmission time. In a digital measuring technique, certain elements of the frequency divider will be required to operate at a frequency in excess of present day capabilities. While analog techniques for measuring the position of sample pulses with respect to the center of received signal elements is slightly faster than digital techniques, the control of reference levels, the charging and discharging of capacitors at very high frequencies, present great problems.

It is therefore an object of this invention to provide a system for sampling serially received signal elements over a frequency range never before attainable.

It is also an object of this invention to provide a system for sampling serially received signal elements at very high frequencies utilizing logical circuitry for deriving a signal which controls the frequency of the receiver sampling pulse.

Another object of the present invention is to provide a system for controlling the sampling of serially received signal elements wherein digital techniques are used for adjusting the position of a sampling pulse to the center of received signal elements.

An additional object of this invention is to provide a system for controlling the generation of a sample pulse to position it at the center of serially received signal elements utilizing digital techniques wherein the control signal utilized to adjust the time of occurrence of the sample pulse is equivalent to a control signal normally obtained only by analog techniques.

It is a further object of this invention to provide a system for controlling the generation of a sample pulse of serially received signal elements utilizing digital techniques wherein none of the elements of the system are required to operate at a frequency greater than the transmission frequency.

These and other objects, features and advantages of the present invention are achieved in a preferred embodiment wherein the mark-space condition of serially received signal elements are detected by a sample pulse obtained from a reference wave having a frequency substantially equal to the frequency of the received signal elements. A storage device is provided, responsive to the mark-space condition of the signal elements sampled, for producing a reconstruction of the received signal elements which is accurately timed and free of distortion with respect to the reference wave. The reconstructed signal elements will have a phase and frequency directly related to the receiver reference wave whereas the received signal elements from the transmission line may have been distorted such that their width, frequency, or time position with respect to the reference wave has been changed. The mark-space condition of the received signal elements from the transmission line, the reference wave, and the distortion-free reconstructed signal are combined in a binary logic system which produces an indication of the relationship between the three mentioned signals. The output of the binary logic is utilized to provide a signal which assumes three voltage levels in accordance with the mark-space relationship of the signals. The three voltage levels include a reference voltage, a voltage more positive than the reference, and a voltage more negative than the reference. The positive and negative voltages differ from the reference voltage by an equal amount. Means are provided for obtaining an average value of the three-voltage-level signal over a period of time. The average value of the three-level signal is indicative of the position of the sample pulse with respect to the center of received signal elements. An average value of the three-level signal which differs from the reference voltage is an error signal and is applied to the generator of the reference wave to adjust its frequency. The position of the sample pulse with respect to the received signal elements is thereby adjusted to place it at the center of the serially received signal elements.

The foregoing and other objects, features and advantages of the invention will be apparent from the following more particular description of a preferred embodiment of the invention, as illustrated in the accompanying drawings.

Figure 1:
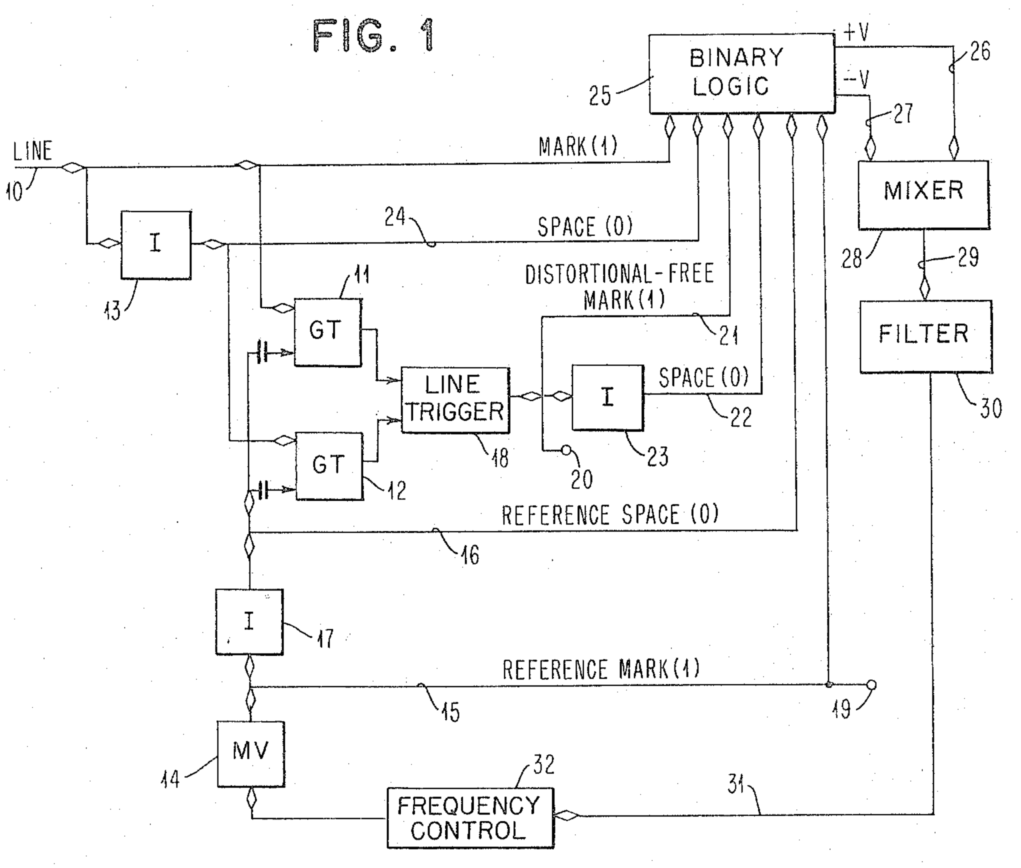
FIGURE 1 is a block diagram of the system utilized to adjust the frequency of serially received signal element sample pulses.
Figure 2:
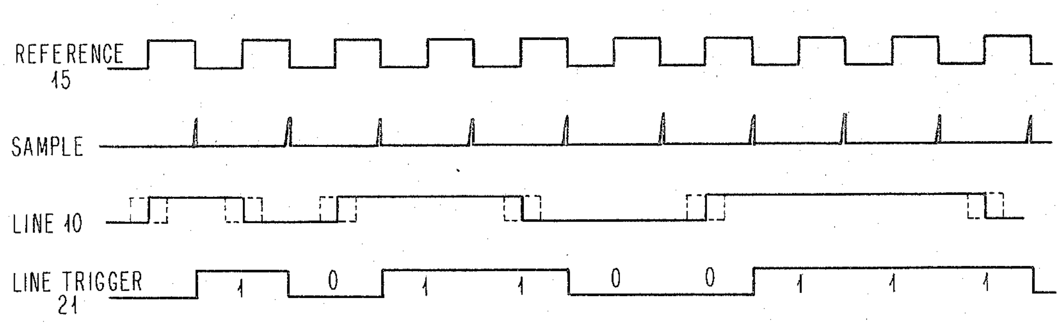
FIGURE 2 is a series of wave forms showing the relationship between serially received mark-space signal elements subject to distortion and other wave forms from FIGURE 1 including the sample pulse.

Referring to FIGURES 1 and 2, serially received signal elements are received on LINE 10. A mark, or binary 1, is represented by a relatively positive potential while a space, or binary 0, is represented by a relatively negative potential. In the operation of the binary logic and other elements to be discussed, relatively positive potentials are the significant levels. Thus, when a mark or binary 1 is present, the designated line will present a relatively positive potential while the complement line through an inverter will be at a relatively negative potential. In the presence of a space, or binary 0, condition for a particular wave form, the line labeled "mark" will be at a relatively negative potential while the line labeled "space" will be at a relatively positive potential.

The mark-space condition of LINE 10 will be sampled at gates 11 and 12 respectively. In the presence of a mark condition, gate 11 will be conditioned and in the presence of a space condition, gate 12 will be conditioned through the inverting operation of an inverter 13. Sampling of the mark-space condition of LINE 10 at gates 11 and 12 is accomplished by suitably differentiated portions of a reference wave or clock signal generated from a multi-vibrator 14. The output of multi-vibrator 14 is a reference wave or clock consisting of alternate mark-space conditions having a cyclic frequency substantially equal to the frequency of the signal elements received on LINE 10. Line 15 from multi-vibrator 14 is positive during a mark portion of the cycle and a line 16 is at relatively positive potential during the space interval of the output of multi-vibrator 14 through the action of an inverter 17. The transition from mark to space of the reference wave produced by multi-vibrator 14 is differentiated to produce a sample pulse at gates 11 and 12. It is the function of the remainder of the circuits shown in FIGURE 1 to insure that the sample pulse at gates 11 and 12 is maintained as close to the center of received signal elements on LINE 10 as possible.

The outputs of either gate 11 or 12, depending upon the mark-space condition of LINE 10, are applied to a LINE TRIGGER 18. The output of trigger 18 is a reconstruction of the received signal elements on LINE 10. Even though the received signal elements on LINE 10 may be distorted and/or displaced with respect to the sample pulse applied to gates 11 and 12, the reconstructed signal from LINE TRIGGER 18 is synchronized with and free of any width distortion with respect to the reference wave produced by multi-vibrator 14. The reference wave from multi-vibrator 14 and the distortion-free signal from LINE TRIGGER 18 may be applied to a utilizing system from the terminals at 19 and 20 respectively. The mark-space condition of trigger 18 is represented on lines 21 and 22 respectively. Line 21 will be a relatively positive potential during a mark condition, and line 22 will be at a relatively positive potential during a space condition through the action of an inverter 23. A relatively positive potential of a space condition on LINE 10 is provided from inverter 13 on a line 24.

The mark-space condition of the received signal elements on LINE 10, the distortion-free signals from LINE TRIGGER 18 and the reference wave or clock signals from multivibrator 14 are applied to BINARY LOGIC 25. Depending on the relationship of the mark-space conditions presented to the binary logic 25, to be more fully explained, either a positive voltage or an equal and opposite negative voltage or an absence of either of these voltages is generated. The positive voltage (+V) on a line 26 and the negative voltage (−V) on a line 27 are applied to a MIXER 28.

The output of mixer 28 on line 29 will be a wave form having three voltage states. The voltage states, dependent upon the output of the binary logic 25, will be either +V, −V, or in the absence of either, a reference potential. This wave form is applied to a filter 30 which provides on a line 31 an error voltage which varies in accordance with the average value of the three voltage levels from mixer 28. The error signal on line 31 is indicative of the relative position of the received signal elements on LINE 10 and the reference signals from multi-vibrator 14. The error signal on line 31 is applied to a frequency control device 32 which will be effective to adjust the frequency of multi-vibrator 14 in the proper direction to reduce the error signal on line 31 to the reference voltage. In response to the adjustment of the frequency of multi-vibrator 14, the sample pulse utilized to detect the mark-space condition of the received signal elements at gates 11 and 12, will be adjusted to bring it as close as possible to the center of the received signal elements.

In FIGURE 2, a series of mark-space elements received on LINE 10 are shown relative to the reference wave 15, from multi-vibrator 14, the sample pulse at gates 11 and 12, and the output of LINE TRIGGER 18. The solid wave form representing the line condition represents an ideal situation wherein the received signal elements retain their desired width, time position, and frequency with respect to the received sample pulse. The dotted portion of the wave form shows how transitions between mark and space elements can vary and be distorted. Nine different combinations of transitions and reference wave positions can occur. The sample pulse may occur at the center of a received element, but the element may be wider than or narrower than the predetermined desired width. The received signal elements may be of the desired width, but due to line jitter, the sample pulse may occur to the right or left of center of the signal elements. Further, the leading edge of a signal element may occur at the proper time with respect to the sample pulse, but the trailing edge may be displaced. Also, the leading edge of the signal element may be displaced but the trailing edge of the signal element will be proper. It is the function of the prior art systems and of the present invention to recognize the various distortions with respect to a sample pulse and to correct the generation of the sample pulse to maintain it centered on the signal elements. It is evident that a further function of the systems is to compensate for a difference in frequency between the oscillator controlling the transmission of the signal elements and the oscillator controlling the generation of the reference wave and sample pulse. If the difference in frequency went uncorrected, the sample pulse would drift right or left of center until reliability of the detected information is lost.

It is assumed in connection with the discussion of the present invention and of the prior art systems, that a condition recognized as "character phase" has been established, meaning that the utilizing system is capable of distinguishing between adjacent multi-element characters. It is the purpose of the invention to insure that the sample pulse is maintained within the period of a received element, often referred to as "bit phase." A technique for establishing character phase has been disclosed in the above-mentioned copending application.

Figure 3:
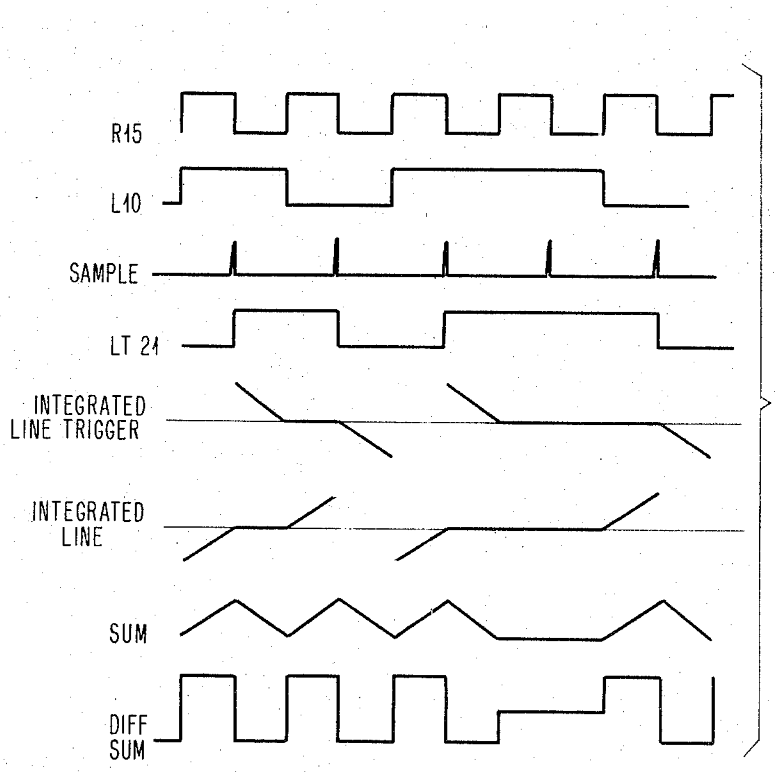
FIGURES 3 and 4 are wave forms showing various relationships between serially received signal elements and sample pulses utilized to show prior art analog techniques for adjusting the generation of the sample pulse and which further show the manner in which the analog technique was used to derive a digital system.
Figure 4:
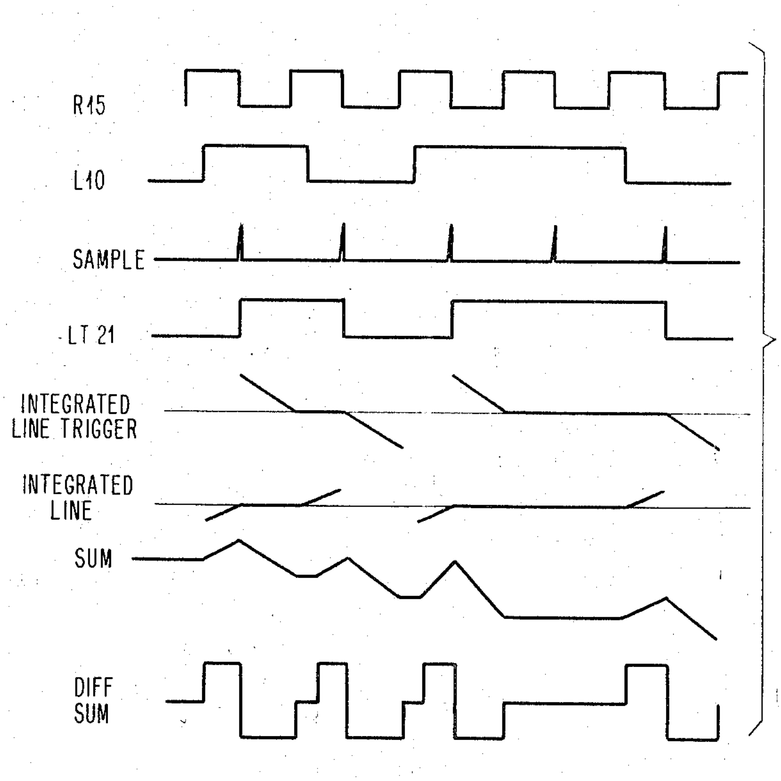

FIGURE 3, which shows a reference wave and sample pulse centered with respect to receive signal elements, and FIGURE 4 which shows a sample pulse to the left of the center of received signal elements, will be utilized to explain prior are digital and analog techniques for centering. FIGURES 3 and 4 further disclose a relationship which led to the present invention.

The prior art digital and analog techniques provide means for indicating the position of the sample pulse relative to the received signals by making a measurement of the time between a transition from a space to mark condition until the occurrence of the sample pulse and a measurement of the time between a transition from mark to space and the next occurring sample pulse. In the digital technique, this was accomplished by providing an oscillator running at a frequency much higher than the transmission rate such that a predetermined number of oscillator pulses were divided to generate the sample pulse. A counter is provided which cumulates a counter of oscillator pulses occurring between the space to mark transition and next occurring sample pulse and the oscillator pulses produced from the mark to space transition to the next occurring sample pulse. A deviation of the sample pulse from the center of received signal elements is detected by logic associated with the counter which is able to detect whether the accumulated count was greater than or less than the normal number of oscillator pulses generating the sample pulse from the divider. An error indication is utilized to change the natural frequency of the divider such that the sample pulse from the divider can be advanced or retarded in time. It was readily apparent that with increased transmission rates to the two megacycle range, the divider principle for adjusting the sample pulse would require an oscillator and at least one element of the divider and counter to operate at a frequency much higher than the transmission rate.

In an attempt to provide a clock capable of 2 megacycle transmission rates in a system shown in the above-referred to copending application, it was thought that analog methods would be desirable. The wave form shown in FIGURES 3 and 4 labeled INTEGRATED LINE show one method of determining the sample pulse position with respect to the signal elements received on the line. When the received signal element changes from a space to a mark condition, the signal is integrated to generate a ramp. As the time of the sample pulse, the integration is ended and held at the level accumulated. When the received signal element changes from a mark to a space condition, integrate the signal and add this signal to the value accumulated on the first integration. At the next sample pulse end the integration and hold the level accumulated. The accumulated level is then compared to a reference level. If the accumulated level is over the reference level, the sample pulse must be advanced in time, if it is under the reference level, the sample pulse must be retarded in time. One of the major problems of this technique in high speed operation is the necessity of comparing voltage levels and resetting the final accumulated level before the next space to mark transition occurs.

Another analog method alleviating the problem of comparing reference voltage levels and resetting the integrated levels is to substract a similar intergrated level that has been derived from an exact and distortion-free representation of the signal element. The LINE TRIGGER 18 of FIGURE 1 provides a means whereby a distortion-free element-related signal is produced such that it would be possible to use this distortion-free signal to derive an exact reference integration. In this situation, an integration controlled by the distortion-free signal from the line trigger is subtracted from the integration controlled by the received signal elements. The two integrated signals are combined to form the SUM signal shown in FIGURES 3 and 4. Many combinations of integrated line trigger signals and integrated received signal elements have been tried and all have introduced problems because of varying reference levels with bit sequence and distortion. The SUM signals resulting vary with bit pattern and increase or decrease as a function of time.

If the SUM signals shown in FIGURES 3 and 4 are differentiated, the undesirable levels are removed. The differentiated sum signal (DIFF SUM) is shown in the bottom wave form of FIGURES 3 and 4. When the differentiated signals are filtered to remove high frequency components, a signal will be produced that varies in value about a fixed zero reference. This signal contains accurate correction information and can be referred to as a correction signal. The average value of the differentiated sum signal contains information which dictates the direction and amount of correction necessary to align the sample pulse with the received signal elements. The average value for a centered sample pulse condition has a zero average value. With the sample pulse left of center a negative average value is produced, and with the sample pulse to the right of center a positive average value is produced. In considering this analog approach it became evident that the sum of the two integrated signals may at time increase or decrease continuously toward infinity as in FIGURE 4. Providing circuitry to compensate for, and be accurate over, such wide range of voltage levels presented an undesirable situation.

When a differentiation of the sum signal was attempted and studied, a relationship was recognized, apparent from FIGURES 3 and 4, that a digital relationship existed between the reference signal or clock, the mark-space condition of the line, and the mark-space condition of the line trigger. State diagrams can be drawn showing the digital relationship between the reference signal, received signal elements, line trigger signals, and the resulting differentiated sum signal for all of the types of distortion problems encountered. The result of this work was a system of binary logic adapted to receive the mark-space condition of the received signal element, the reference signal, and the distortion-free signal to generate an output identical with the differentiated sum signal normally generated in an entirely analog system. The resultant logic provides a means for controlling the generation of the sample pulse which does not require elements of the system to operate at frequencies in excess of the transmission frequency nor are the adverse affects of varying reference levels in analog techniques encountered.

Figure 5:
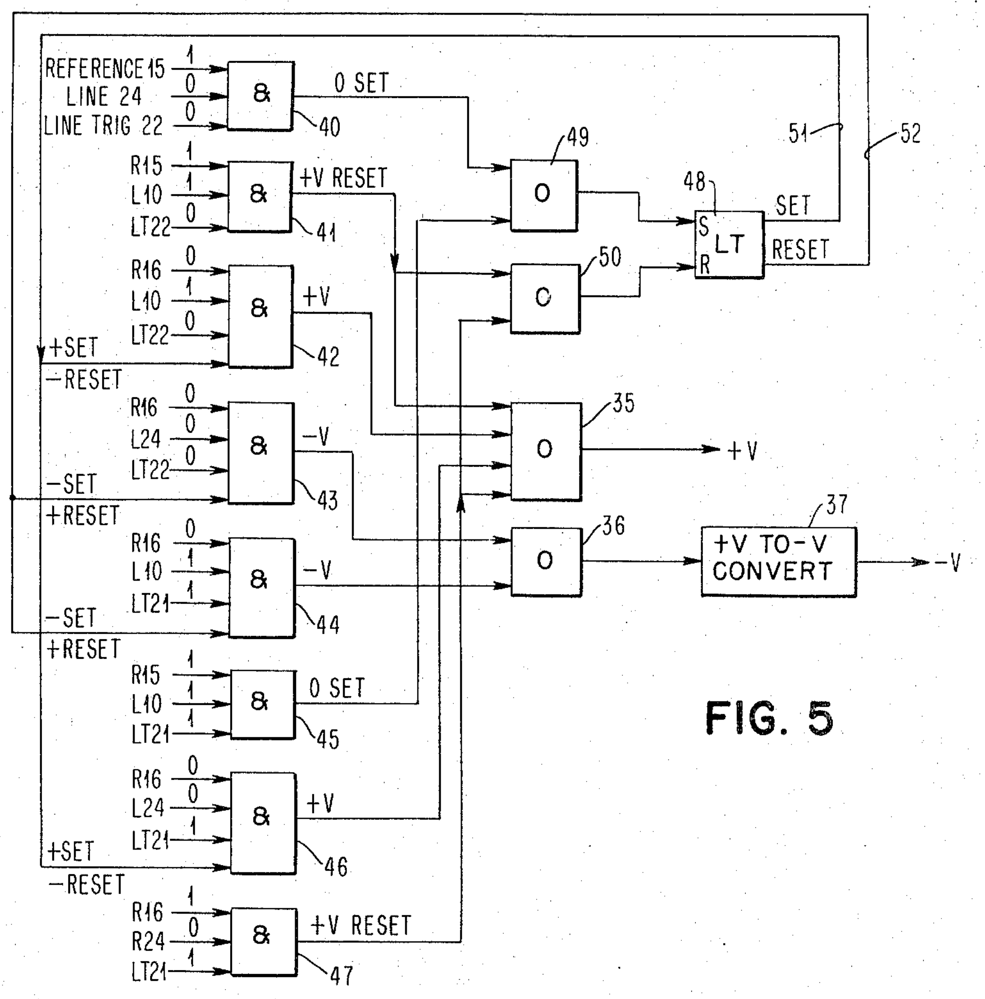
FIGURE 5 is a logic block diagram showing the BINARY LOGIC of FIGURE 1 in greater detail.
Figure 6:
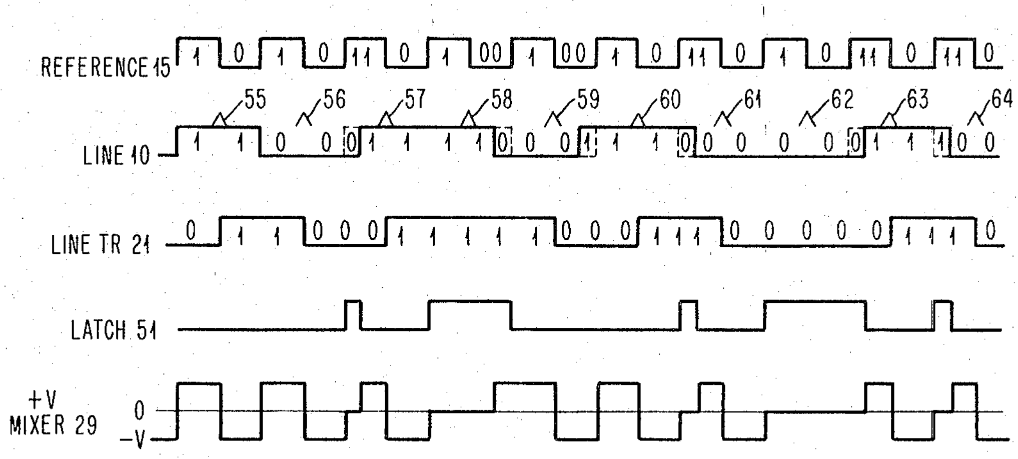
FIGURE 6 is a series of wave forms utilized to explain the operation of the BINARY LOGIC shown in FIGURE 5.

The BINARY LOGIC 25 shown in FIGURE 1 is described and shown in more detail in connection with FIGURES 5 and 6. It is the function of the binary logic of FIGURE 5 to provide an input to MIXER 28 of FIGURE 1 which will produce an output equivalent to the differentiated sum signal shown in FIGURES 3 and 4. The output of the binary logic must indicate when the output of MIXER 28 is to be at a reference level, a positive voltage or a negative voltage. When the output of MIXER 28 is to be at +V, an OR circuit 35 generates a logical output. The normal logical output of OR circuit 35 is utilized as the positive voltage +V. When the mixer output is to be at −V, the logical output of an OR circuit 36, which is a positive voltage, is converted in a converter 37 to the negative —V voltage required. In the absence of an output from either OR circuit 35 or 36, the output of MIXER 28 of FIGURE 1 will be at the reference potential.

The mark-space condition of the received signal elements, the reference signal, and the distortion-free signal, are combined in binary logic represented by a series of AND circuits 40 through 47. During the use of the state diagrams in the development of the logic shown in FIGURE 5, it was discovered that certain combinations of the three input signals invariably resulted in producing the desired voltage level of the filter output. These combinations of binary signals are applied to AND circuits 40, 41, 45, and 47. The state diagrams further revealed that a method must be provided for indicating the past history of the three level output of the MIXER 28 of FIGURE 1 to control the operation of the remaining AND circuits. This past history is noted by a latch 48 provided with inputs from an OR circuit 49 and an OR circuit 50. When latch 48 is in the set condition, a line 51 is at a relatively positive potential and a line 52 is at a relatively negative potential. When the latch 48 is in the reset condition, the conditions of lines 51 and 52 are reversed. AND circuits 42, 43, 44 and 46 have as additional inputs the output from latch 48.

The wave forms of FIGURE 6 show various combinations of mark-space or binary 1 and binary 0 conditions of the multivibrator 14 on line 15, the received signal elements of the LINE 10 and the distortion-free signal of LINE TRIGGER 18 on line 21. The solid portion of the wave form for the received signal elements of LINE 10 represents received signal elements which have been distorted in various ways. The dotted portion of the wave form represents the ideal condition for the received signal elements. The average value of the wave form for the output 29 of MIXER 28, when compared with the relative position of the sample pulses shown on the wave form representing the received signal elements, bears out the positional error shown and the required correction to the frequency of the multi-vibrator 14 of FIGURE 1.

Sample pulses 55 and 56 are properly positioned with respect to the mark-space transitions and during this period the mixer wave form shows an average value of zero. The distortion of the received signal elements received between sample pulses 56 and 57 indicate that the frequency of the multi-vibrator should be decreased to move the sample pulse to the right with respect to the transition received. As a result of this distortion, the mixer wave form shows an average negative value which would be applied to the multi-vibrator to decrease its frequency. The relationship of sample pulses 58 and 59 with respect to the early occurrence of the mark-to-space transition indicate that the sample pulses should be moved to the left by increasing the frequency of the multi-vibrator. This type of correction is indicated by the mixer wave form which shows during this period an average positive value. Although the received signal element sampled by sample pulse 60 has been distorted, the sample pulse is centered with respect to the transitions such that the average value of the mixer wave form during this period shows an average value of zero. The distortion of the received signal element sampled by sample pulse 60 caused a mark-to-space transition to occur closer to sample pulse 61 than desired indicating that the sample pulse should be moved to the right by a decrease in the multi-vibrator frequency. The frequency of the multi-vibrator will be decreased by the mixer output as the wave form now shows an average negative value. As the result of jitter, sample pulse 63 samples the received signal element to the left of the center indicating it should be moved to the right by a decrease of the multi-vibrator frequency and this condition is shown by the mixer wave form which now has an average negative value. It is understood that such abrupt changes as described above do not occur in normal practice, but were presented to demonstrate the system's capability.

An example of the operation of the latch 48 of FIGURE 5 will now be described in connection with the wave forms of FIGURE 6. The binary combination 110 immediately preceding sample pulse 57 applied to AND circuit 41 invariably produces a mixer output of +V through OR 35. The output of AND circuit 41 is also utilized through OR circuit 50 to reset latch 48. The binary combination 011 immediately following sample pulse 57 is applied to AND circuit 44. With latch 48 reset and line 52 positive, AND circuit 44 is enabled to provide an output to OR circuit 36 to ultimately generate the mixer output of —V. The next following binary combination 111 is presented to AND circuit 45 which invariably produces a mixer output of 0 since neither +V or —V is produced. The output of AND circuit 45 is further utilized through OR circuit 49 to set latch 48. At this time the binary combination 011 immediately following sample pulse 58 is again applied to AND circuit 44. However, latch 48 is in the set condition with line 52 relatively negative such that AND circuit 44 does not have all inputs at a positive potential preventing the generation of an output. As a result, the binary combination 011 which previously generated —V from the mixer is prevented from generating —V and the output of the mixer remains at the 0 reference level. When the transition occurs after the sample pulse 58, the binary combination 001 in combination with the positive level of line 51 from latch 48 is effective at AND circuit 46 to generate the +V output from the mixer. The binary combination 101 immediately preceding sample pulse 59 is effective at AND circuit 47. The +V output of the mixer is not changed but the output of AND circuit 47 is effective through OR circuit 50 to reset latch 48. Through the joint action of the binary combinations presented to AND circuits 40 through 47, and the operation of latch 48, a mixer output is produced which is exactly the same as the output which would normally have been produced in an entirely analog system.

Referring to FIGURE 1, the wave form shown in FIGURE 6 for the mixer 28 is applied to FILTER 30 to produce a frequency control signal on line 31 which varies in a sense indicative of the average value of the mixer output which, in the first instance, is an indication of the displacement of sample pulses with respect to the received signal elements. This error or control signal is applied to a suitable FREQUENCY CONTROL 32. The frequency control 32 may take the form of a voltage responsive means, or servo motor, to change the setting of a charging capacitor in the multi-vibrator 14 or a crystal oscillator. The frequency control 32 may be connected to the multi-vibrator 14 to change the voltage to which capacitors within the multi-vibrator 14 are charged. Either way, the frequency of multi-vibrator 14 and the reference wave is changed to adjust the relative position of sample pulses with respect to the received signal elements to maintain the sample pulses near the center of the received signal elements.

There has thus been shown in the foregoing description a system which is entirely binary in character capable of controlling the relative position of sample pulses with respect to received signal elements. The binary system is not required to operate at a frequency in excess of the transmission frequency nor does the system contain analog elements with varying reference levels and the problem of resetting the analog elements at a high frequency.

While the invention has been particularly shown and described with reference to a preferred embodiment thereof, it will be understood by those skilled in the art that various changes in form and details may be made therein without departing from the spirit and scope of the invention.

What is claimed is:

1. A system for controlling the generation of a reference wave used to sample at an optimum time serially received signal elements transmitted at a predetermined frequency, said system including in combination:

means producing a reference signal having an adjustable frequency substantially equal to said predetermined frequency;

means responsive to said reference signal and received signal elements for producing a signal which is a reconstruction of said received elements and which is distortion-free with respect to said reference signal;

logic means, responsive to said received signal elements, said reference signal, and said distortion-free signal for producing an output representing the phase relationship between said three inputs;

and means, responsive to the output of said logic means, connected to said reference signal producing means, for adjusting the generation of said reference signal to sample the received elements at the optimum time.

2. A system for controlling the generation of a reference wave used to sample at an optimum time the mark-space condition of serially received signal elements transmitted at a predetermined frequency, said system including in combination:

a variable frequency multi-vibrator for producing a cyclic reference signal of alternate mark-space conditions having a cyclic frequency substantially equal to said predetermined frequency;

means responsive to said reference signal for producing a sample pulse;

means responsive to said sample pulse and received signal elements for producing a signal which is a reconstruction of said received mark-space elements and which is distortion-free with respect to said reference signal;

logic means, responsive to said received signal elements, said reference signal, and said distortion-free signal for producing a signal representing the mark-space relationship between said three inputs;

means responsive to the output of said logic means for producing a control signal varying in a sense indicative of the displacement of said sample pulse with respect to the optimum sample time;

and means connecting said control signal to said multivibrator for adjusting the frequency of said multivibrator whereby said sample pulse is adjusted to sample the received elements at the optimum time.

3. A system in accordance with claim 2 wherein said logic means includes:

binary combinatorial logic means for receiving the mark-space condition of said received elements, said reference signal, and said distortion-free signal;

and first and second output means for said binary logic means, for producing a signal on either said first or second output or no signal on either of said outputs dependent on the mark-space relationship of said three inputs.

4. A system in accordance wtih claim 3 wherein said logic means includes:

mixer means connected to said first and second binary logic output means, operative to produce a signal having three possible voltage levels corresponding respectively to the three possible output conditions of said binary logic output means.

5. A system in accordance with claim 4 wherein said mixer means includes:

means responsive to the absence of a signal on either of said binary logic output means producing a reference voltage;

means responsive to a signal on said first output means providing a positive voltage with respect to said reference;

and means responsive to a signal on said second output means producing a negative voltage with respect to said reference equal to said positive voltage.

6. A system in accordance with claim 5 wherein said control signal producing means includes:

filter means responsive to said mixer output for producing a control signal varying in accordance with the average value of said three-voltage-level signal.

7. A system for controlling the generation of a reference wave used to sample at an optimum time the mark-space condition or binary state of serially received signal elements transmitted at a predetermined frequency, said system including in combination:

means producing a cyclic reference signal of alternate mark-space conditions having a cyclic frequency substantially equal to said predetermined frequency;

means for adjusting the frequency of said reference signal producing means;

means responsive to said reference signal and received signal elements for producing a signal which is a reconstruction of said received mark-space elements and which is distortion-free with respect to said reference signal;

logic means, responsive to said received signal elements, said reference signal, and said distortion-free signal for producing a three-state signal representing the mark-space relationship between said three inputs, said three-states being either a reference potential or one of two potentials equally more positive or negative than said reference;

means connected to said adjusting means, responsive to the output of said logic means for producing a control signal varying in accordance with the average value of said three-state signal, to thereby control the frequency of said reference signal to sample the received elements at the optimum time.

8. A system for controlling the generation of a reference wave used to sample, at an optimum time, serially received signal elements transmitted at a predetermined frequency, said system including in combination:

means producing a reference signal having an adjustable frequency substantially equal to said predetermined frequency;

means responsive to said reference signal and received signal elements for producing a signal which is a reconstruction of said received elements and which is distortion-free with respect to said reference signal;

logic means, responsive to said received signal elements, said reference signal, and said distortion-free signal for producing an output representing the phase relationship between said three inputs;

and means, responsive to the output of said logic means, for producing an error signal which varies in a sense and magnitude related to the displacement of said reference wave from the optimum time.

9. All features of the invention herein disclosed.

References Cited by the Examiner

UNITED STATES PATENTS 3,096,506 7/1963 Chao Kong Chow et al. 340—146.3

3,116,458 12/1963 Margopoulos ----- 328—151 X

ARTHUR GAUSS, *Primary Examiner*

J. J. JORDAN, *Assistant Examiner.*

UNITED STATES PATENT OFFICE
CERTIFICATE OF CORRECTION

Patent No. 3,293,555 December 20, 1966

Alexander Mazure et al.

It is hereby certified that error appears in the above numbered patent requiring correction and that the said Letters Patent should read as corrected below.

Column 2, line 2, for "ssystems" read -- systems --; column 3, line 60, after "at" insert -- a --; column 5, line 18, for "are" read -- art --; column 7, line 74, for "occui" read -- occur --; column 10, line 59, strike out "9. All features of the invention herein disclosed."

Signed and sealed this 26th day of September 1967.

(SEAL)
Attest:

ERNEST W. SWIDER
Attesting Officer

EDWARD J. BRENNEI
Commissioner of Patents